United States Patent
Tomimatsu (10) Patent No.: US 9,983,539 B2
(45) Date of Patent: May 29, 2018

(54) VOLTAGE ADJUSTMENT SYSTEM, IMAGE FORMING APPARATUS AND VOLTAGE ADJUSTMENT METHOD

(71) Applicant: KYOCERA Document Solutions Inc., Osaka-shi, Osaka (JP)

(72) Inventor: Tetsuo Tomimatsu, Osaka (JP)

(73) Assignee: KYOCERA DOCUMENT SOLUTIONS INC., Osaka-shi, Osaka (JP)

(*) Notice: Subject to any disclaimer, the term of this patent is extended or adjusted under 35 U.S.C. 154(b) by 262 days.

(21) Appl. No.: 15/163,124

(22) Filed: May 24, 2016

(65) Prior Publication Data
US 2016/0349692 A1    Dec. 1, 2016

(30) Foreign Application Priority Data

May 25, 2015   (JP) .................................. 2015-105583

(51) Int. Cl.
*G03G 15/00*    (2006.01)
*H04N 1/00*    (2006.01)
*G06F 1/26*    (2006.01)
*H02J 9/00*    (2006.01)

(52) U.S. Cl.
CPC ............... *G03G 15/80* (2013.01); *G06F 1/26* (2013.01); *H04N 1/00888* (2013.01); *H04N 1/00896* (2013.01); *H04N 1/00899* (2013.01); *H02J 9/005* (2013.01)

(58) Field of Classification Search
None
See application file for complete search history.

(56) References Cited

FOREIGN PATENT DOCUMENTS

JP    8-184637    7/1996
JP    2001-34502    2/2001

*Primary Examiner* — Nitin Patel
(74) *Attorney, Agent, or Firm* — Gerald E. Hespos; Michael J. Porco; Matthew T. Hespos (57) ABSTRACT

The detection section is configured to detect first and second DC voltages output. The voltage adjustment section is configured to adjust each of first and second setting values to cause a corresponding one of the first and second DC voltages detected by the detection section to fall within an allowable voltage range in which a desired supply voltage to each of a sub CPU and a main CPU is set as a center value, and, write the adjusted first and second setting values in a memory as the first and second setting values at the time of re-activation of the circuit board.

5 Claims, 10 Drawing Sheets

| DC VOLTAGE | MINIMUM VOLTAGE | MAXIMUM VOLTAGE |
|---|---|---|
| V1 | 1.0V | 1.2V |
| V2 | 1.0V | 1.2V |

| No. | CONDITION OF V1 [V] | CONDITION OF V2 [V] | CRITERION OF VOLTAGE DIFFERENCE | ADJUSTMENT METHOD |
|---|---|---|---|---|
| P1 | LESS THAN 1.06 | GREATER THAN 1.14 | — | ADJUSTMENT WIDTH: V1 → +0.03V, V2 → −0.03V |
| P2 | LESS THAN 1.06 | 1.11–1.14 | 40 mV OR MORE | ADJUSTMENT WIDTH: V1 → +0.03V, V2 → −0.01V |
| P3 | 1.06–1.09 | GREATER THAN 1.14 | 40 mV OR MORE | ADJUSTMENT WIDTH: V1 → +0.01V, V2 → −0.03V |
| P4 | 1.06–1.09 | 1.11–1.14 | 40 mV OR MORE | ADJUSTMENT WIDTH: V1 → +0.01V, V2 → −0.01V |
| P5 | 1.11–1.14 | 1.06–1.09 | 40 mV OR MORE | ADJUSTMENT WIDTH: V1 → −0.01V, V2 → +0.01V |
| P6 | GREATER THAN 1.14 | 1.06–1.09 | 40 mV OR MORE | ADJUSTMENT WIDTH: V1 → −0.03V, V2 → +0.01V |
| P7 | 1.11–1.14 | LESS THAN 1.06 | 40 mV OR MORE | ADJUSTMENT WIDTH: V1 → −0.01V, V2 → +0.03V |
| P8 | GREATER THAN 1.14 | LESS THAN 1.06 | — | ADJUSTMENT WIDTH: V1 → −0.03V, V2 → +0.03V |

| No. | CONDITION OF V1 [V] | CONDITION OF V2 [V] | CRITERION OF VOLTAGE DIFFERENCE | ADJUSTMENT METHOD |
|---|---|---|---|---|
| P1 | LESS THAN 1.06 | 1.09–1.11 | – | ADJUSTMENT WIDTH: V1 → + 0.03V |
| P2 | GREATER THAN 1.14 | 1.09–1.11 | – | ADJUSTMENT WIDTH: V1 → – 0.03V |
| P3 | 1.09–1.11 | LESS THAN 1.06 | – | ADJUSTMENT WIDTH: V2 → + 0.03V |
| P4 | 1.09–1.11 | GREATER THAN 1.14 | – | ADJUSTMENT WIDTH: V2 → – 0.03V |

VOLTAGE ADJUSTMENT SYSTEM, IMAGE FORMING APPARATUS AND VOLTAGE ADJUSTMENT METHOD

CROSS-REFERENCE TO RELATED APPLICATIONS

This application is based on Japanese Patent Application Serial No. 2015-105583 filed in Japan Patent Office on May 25, 2015, the contents of which are hereby incorporated by reference.

TECHNICAL FIELD

The present disclosure relates to a technique for adjusting a supply voltage to a circuit board.

BACKGROUND ART

In recent years, there has been known a system-on-a-chip (SOC) comprising a core configured to be continually energized and a core configured such that energization thereof is interrupted during a power-saving mode. For realizing this, it is necessary to provide two DC-DC converters each corresponding to a respective one of the cores to supply DC voltages to the respective cores, individually. In this case, some SOCs can be sought to satisfy a requirement that a voltage difference between the DC voltages to be supplied to the respective cores should be equal to or less than a given threshold.

As a related art 1, there has been known an information processing apparatus designed to improve yield of semiconductor devices. This apparatus comprises a plurality of microprocessors, and a plurality of power supply modules each corresponding to a respective one of the microprocessors, wherein operable upper and lower limit voltages are detected in each of the microprocessors, and a center value between the upper limit voltage and the lower limit voltage is set as an optimal supply voltage to each of the microprocessors.

As a related art 2, there has been known a technique designed to identify a defective semiconductor chip in a manufacturing process of semiconductor chips easily and reliably, and configured such that a fuse and a diode are provided in a circuit of each of the semiconductor chip, wherein after a wafer probe test, the fuse of a defective one of the semiconductor chips is fused to give a defective product identification mark to the defective semiconductor chip.

However, due to a variation in performance of the DC-DC converters, it is difficult to supply the same voltage to each of the cores. Although it is conceivable to employ a DC-DC converter having less variation in performance to thereby allow the voltage difference between the DC voltages to be supplied to the respective cores, to become equal to or less than a given threshold, this measure leads to an increase in cost.

In the related art 1, there is a problem that, in the case where optimal supply voltages to the respective microprocessors have a large difference therebetween, it becomes impossible to allow the voltage difference between the DC voltages to be supplied to the respective cores, to become equal to or less than a given threshold.

The related art 2 addresses the technical problem of facilitating identification of a defective semiconductor chip, without consideration of stable driving of the SOC. Thus, the related art 2 is largely different from the present disclosure in terms of technical problem.

The present disclosure is directed to providing a technique capable of reducing a voltage difference between DC voltages to be supplied, respectively, to two cores, without an increase in cost of a circuit board.

SUMMARY OF DISCLOSURE

According to one aspect of the present disclosure, there is provided a voltage adjustment system which comprises: a circuit board; and an adjustment device for adjusting a supply voltage to the circuit board, wherein the circuit board includes: an integrated circuit comprising a first core configured such that energization thereof is not interrupted during a power-saving mode, and a second core configured such that energization thereof is interrupted during the power-saving mode; a first power supply circuit configured to produce a first DC voltage to be supplied to the first core, using a first setting value; a second power supply circuit configured to produce a second DC voltage to be supplied to the second core, using a second setting value; and a memory configured to store therein the first and second setting values, and the adjustment device includes: a detection section configured to detect the first and second DC voltages output, respectively, from the first and second power supply circuits; and a voltage adjustment section configured to adjust each of the first and second setting values to cause a corresponding one of the detected first and second DC voltages to fall within an allowable voltage range in which a desired supply voltage to each of the first and second cores is set as a center value, and, write the adjusted first and second setting values in the memory as the first and second setting values at the time of re-activation of the circuit board.

According to another aspect of the present disclosure, there is provided an image forming apparatus which comprises the above circuit board.

According to yet another aspect of the present disclosure, there is provided a method of adjusting a supply voltage to a circuit board, wherein the circuit board includes: an integrated circuit comprising a first core configured such that energization thereof is not interrupted during a power-saving mode, and a second core configured such that energization thereof is interrupted during the power-saving mode; a first power supply circuit configured to produce a first DC voltage to be supplied to the first core, using a first setting value; a second power supply circuit configured to produce a second DC voltage to be supplied to the second core, using a second setting value; and a memory configured to store therein the first and second setting values. The method comprises: detecting the first and second DC voltages output, respectively, from the first and second power supply circuits; adjusting each of the first and second setting values to cause a voltage difference between the detected first and second DC voltages to become equal to or less than a threshold; and writing the adjusted first and second setting values in the memory as the first and second setting values at the time of re-activation of the circuit board.

DESCRIPTION OF EMBODIMENTS (Background to Embodiment of Present Disclosure)

Figure 1:
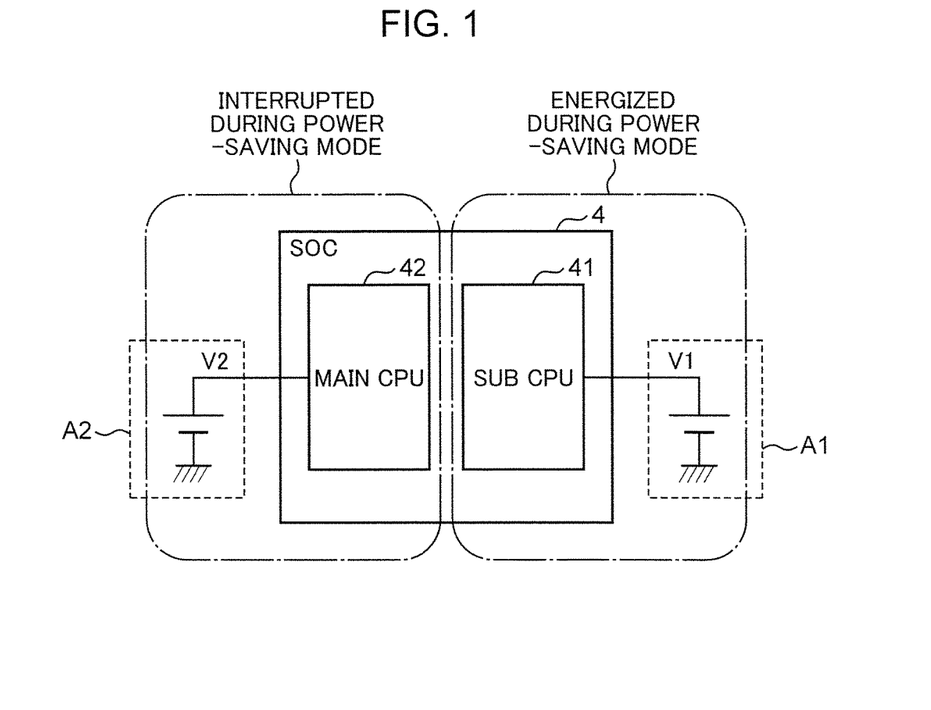
FIG. 1 is a conceptual diagram of a SOC incorporated in an electrical apparatus.

In recent years, a SOC has been widely incorporated in various electrical apparatuses such as an image forming apparatus. FIG. 1 is a conceptual diagram of a SOC incorporated in an electrical apparatus. The SOC 4 comprises a main CPU 42 and a sub CPU 41. With a view to suppressing power consumption, during a power-saving mode, supply of electric power to the main CPU 42 requiring a relatively large amount of current consumption is interrupted, and only the sub CPU 41 is energized. Then, during the power-saving mode, the sub CPU 41 performs minimal processing such as response to a packet in a network. During a normal mode, electric power is supplied to both of the main CPU 42 and the sub CPU 41.

As above, the supply of electric power to the main CPU 42 is interrupted so as to realize the power-saving mode using the SOC 4. Thus, it is necessary to provide two power supply circuits A1, A2 each configured to supply a respective one of first and second DC voltage V1, V2 having the same value to a corresponding one of the sub CPU 41 and the main CPU 42. In this case, a DC-DC converter is employed as each of the power supply circuits A1, A2.

In this regard, a requirement to be fulfilled by each of the power supply circuit A1 configured to supply the first DC voltage V1 to the sub CPU 41 during the power-saving mode and the power supply circuit A2 configured to interrupt supply of the second DC voltage V2 to the main CPU 42 during the power-saving mode is set individually, i.e., fundamentally, there is no dependency between the power supply circuits A1, A2.

Figure 2:
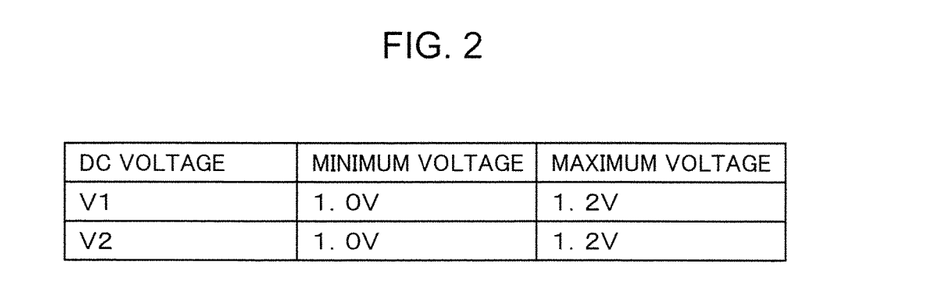
FIG. 2 is a table depicting one example of variations in first DC voltage supplied from a power supply circuit A1 and second DC voltage supplied from a power supply circuit A2.

FIG. 2 is a table depicting one example of variations in the first DC voltage supplied from the power supply circuit A1 and the second DC voltage supplied from the power supply circuit A2. As depicted in FIG. 2, the power supply circuits A1, A2 are configured to supply the respective ones of the first and second DC voltages V1, V2 each varying within a range between minimum voltage of 1.0 V and a maximum voltage of 1.2 V.

However, in some cases, SOC is required to fulfill an exact requirement of eliminating a voltage difference between the first voltage V1 and the second DC voltage V2 by manufacturer. In a DC voltage supplied from a normally-designed power supply circuit, a variation in performance after taking into account of variations in performance of components is calculated as follows.

Figure 3:
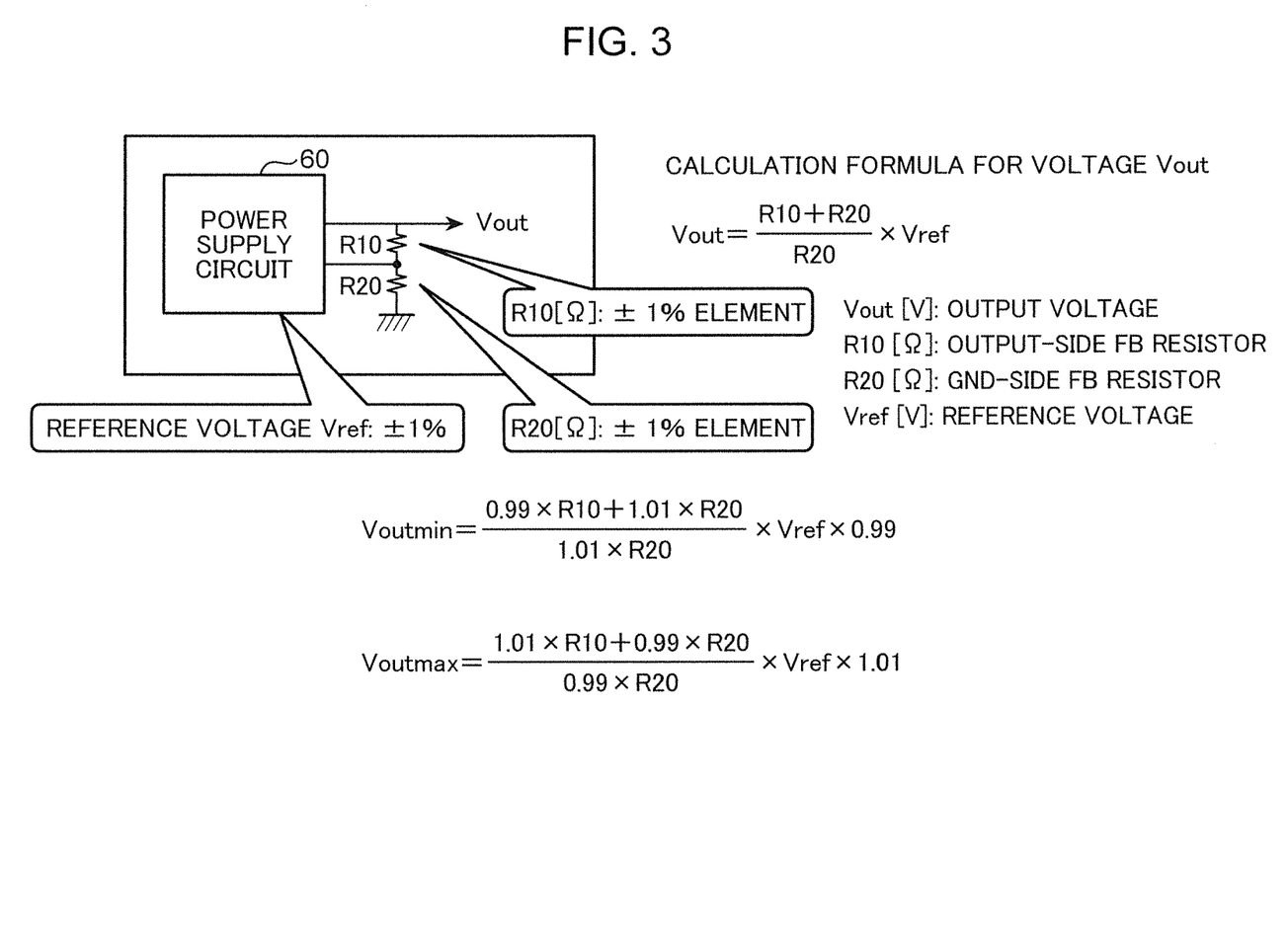
FIG. 3 is an explanatory view of a variation in DC voltage supplied from a power supply circuit.

FIG. 3 is an explanatory view of a variation in DC voltage supplied from a power supply circuit 60. An output voltage Vout of the power supply circuit 60 depicted in FIG. 3 is defined by the following formula: Vout=((R10+R20)/R20)×Vref.

In the example depicted in FIG. 3, a variation in reference voltage Vref from the power supply circuit 60 is estimated to be ±1%, and a variation in each of two voltage-dividing resistors R10, R20 is estimated to be ±1%. A target voltage of the output voltage Vout is set, for example, to 1.1 V. The voltage-dividing resistor R10 is an output-side feedback resistor, and the voltage-dividing resistor R20 is a ground-side feedback resistor.

In this case, a minimum value Voutmin of the output voltage Vout is defined by the following formula: Voutmin= ((0.99×R10+1.01×R20)/1.01×R20)×Vref×0.99. Further, a maximum value Voutmax of the output voltage Vout is defined by the following formula: Voutmin=((1.01×R10+ 0.99×R20)/0.09×R20)×Vref×1.01. Actual values of R10, R20 and Vref were assigned to the above formulas to derive Voutmin and Voutmax. As a result, the worst value of variation in the output voltage Vout was 54 mV.

Although the variation in the output voltage Vout can be suppressed by employing a high-performance power supply circuit and high-performance circuit elements each having less variation in performance, this approach leads to an increase in cost.

Therefore, in an embodiment of the present disclosure, there is provided a voltage adjustment system capable of suppressing a voltage difference between the first and second DC voltages V1, V2 output, respectively, from the power supply circuits A1, A2, without costing.

Embodiment (Configuration of Voltage Adjustment System)

Figure 4:
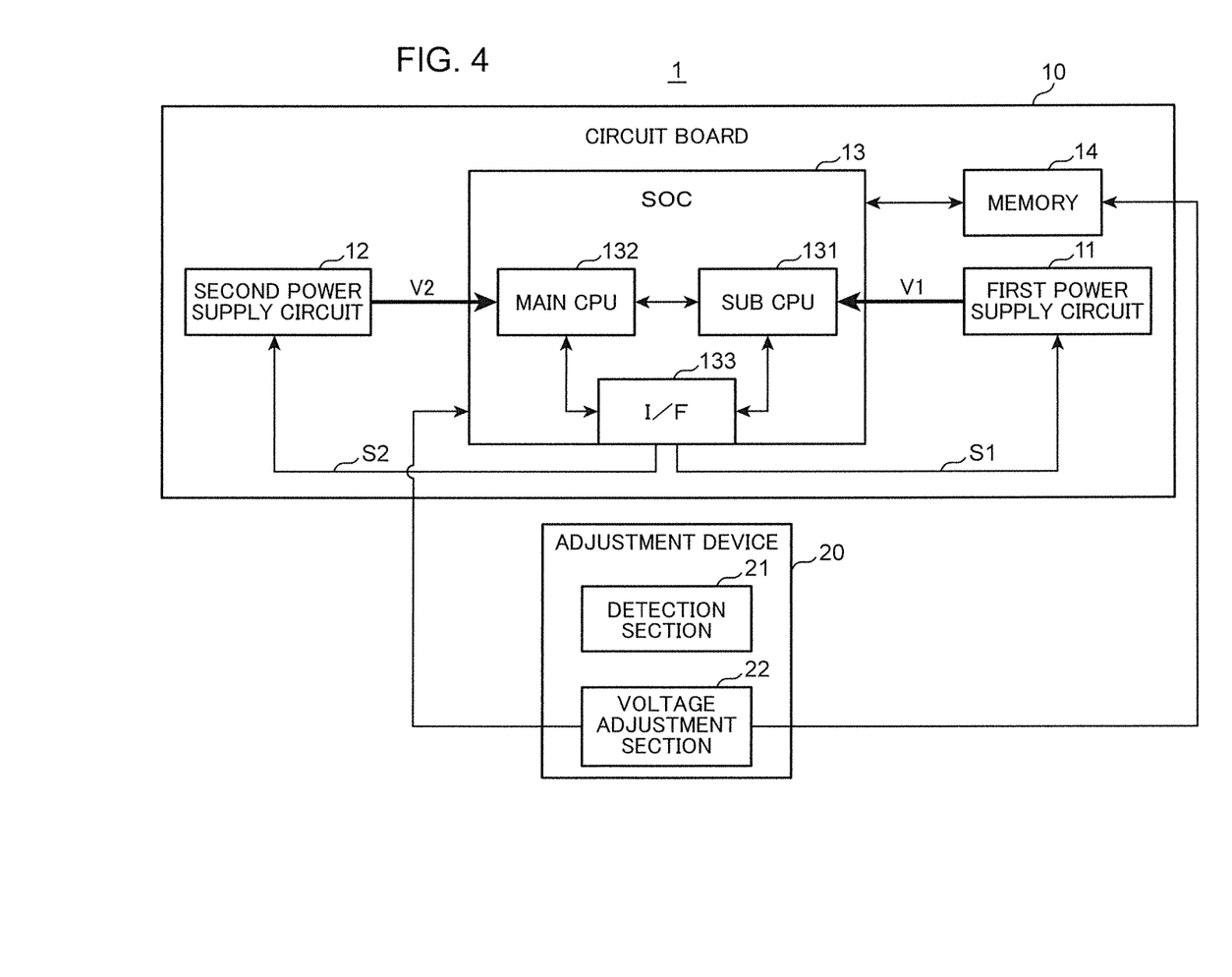
FIG. 4 is a block diagram depicting an overall configuration of a voltage adjustment system according to one embodiment of the present disclosure.

FIG. 4 is a block diagram depicting an overall configuration of a voltage adjustment system 1 according to one embodiment of the present disclosure. The voltage adjustment system 1 comprises a circuit board 10 and an adjustment device 20. For example, the circuit board 10 is designed for use in an electrical apparatus such as an image forming apparatus. In this embodiment, the circuit board 10 is designed for use in a control section 500 of an image forming apparatus 5, as described in detail later in connection with FIG. 11.

The adjustment device 20 is composed, for example, of a function checker, and configured to adjust a supply voltage to the circuit board 10. For example, the function checker is a device for, when the circuit board 10 is mounted in a manufacturing process of the image forming apparatus 5, inspecting whether or not the circuit board 10 normally operates.

The circuit board 10 mounts thereon a first power supply circuit 11, a second power supply circuit 12, a SOC 13 (System-on-a-chip: one example of an integrated circuit or chip), and a memory 14. The first power supply circuit 11 is composed, for example, of a DC-DC converter, and configured to produce a first DC voltage V1 having a voltage value on the basis of a first setting value S1 output from the SOC 13, and supply the first DC voltage V1 to an aftermentioned sub CPU 131.

The second power supply circuit 12 is composed, for example, of a DC-DC converter, and configured to produce a second DC voltage V2 having a voltage value on the basis of a second setting value S2 output from the SOC 13, and supply the second DC voltage V2 to an aftermentioned main CPU 132.

The SOC 13 comprises a sub CPU 131 (one example of a first core), a main CPU 132 (one example of a second core), and an interface (hereinafter described as "I/F 133"). The sub CPU 131 is configured to continually operate while being continually supplied with the first DC voltage V1, irrespective of whether the image forming apparatus 5 is set to a power-saving mode or a normal mode.

The power-saving mode is a mode during which supply of electric power to a part of various electrical components of the image forming apparatus 5 is interrupted. The normal mode is a mode during which electric power is supplied to all of the electrical components of the image forming apparatus 5.

In this embodiment, the sub CPU 131 is configured to operate mainly in the power-saving mode to perform processing such as receiving a packet transmitted from an outside of the image forming apparatus 5 and responding to the packet. The sub CPU 131 is configured to manage in which of the power-saving mode and the normal mode the image forming apparatus 5 is operated. For example, the sub CPU 131 is operable, when no input from a user is accepted in the normal mode for a given period of time, to set a mode of operation of the image forming apparatus 5 to the power-saving mode. On the other hand, the sub CPU 131 is operable, when an input from a user is accepted in the power-saving mode, to set the mode of operation of the image forming apparatus 5 to the normal mode.

When the image forming apparatus 5 is set in the power-saving mode, the supply of the second DC voltage V2 from the second power supply circuit 12 to the main CPU 132 is interrupted under control of the sub CPU 131, and thereby the main CPU 132 is brought into a sleep state. On the other hand, when the image forming apparatus 5 is set in the normal mode, the second DC voltage V2 is supplied from the second power supply circuit 12 to the main CPU 132 under control of the sub CPU 131. In this embodiment, for example, the main CPU 132 is operable, in the normal mode, to control the electrical components of the image forming apparatus 5 to realize a variety of processing (image reading processing, printing processing and others).

The I/F 133 is composed, for example, of an I2C interface, and configured to, under control of the SOC 13, transmit the first setting value S1 to the first power supply circuit 11, and transmit the second setting value S2 to the second power supply circuit 12. In this case, the control of transmitting and receiving of t the first and second setting values S1, S2 may be performed by the sub CPU 131 or may be performed by the main CPU 132.

The memory 14 is composed, for example, of a rewritable nonvolatile storage device, and configured to store therein the first and second setting values S1, S2. At the time of re-activation of the circuit board 10, the first and second setting values S1, S2 stored in the memory 14 are read out by the first and second power supply circuits 11, 12 via the SOC 13, to set the first and second DC voltages V1, V2.

The adjustment device 20 comprises a detection section 21 and a voltage adjustment section 22. The detection section 21 is composed, for example, of a voltage sensor, and configured to detect the first and second DC voltages V1, V2.

The voltage adjustment section 22 is composed, for example, of a processor such as a CPU or an ASIC, and configured to adjust each of the first and second setting values S1, S2 to cause a corresponding one of the first and second DC voltages detected by the detection section 21 to fall within an allowable voltage range in which a desired supply voltage to each of the sub CPU 131 and the maim CPU 132 is set as a center value thereof, and, write the adjusted first and second setting values S1, S2 in the memory 14 as the first and second setting values S1, S2 at the time of re-activation of the circuit board 10.

(Operation of Voltage Adjustment System)

Figure 5:
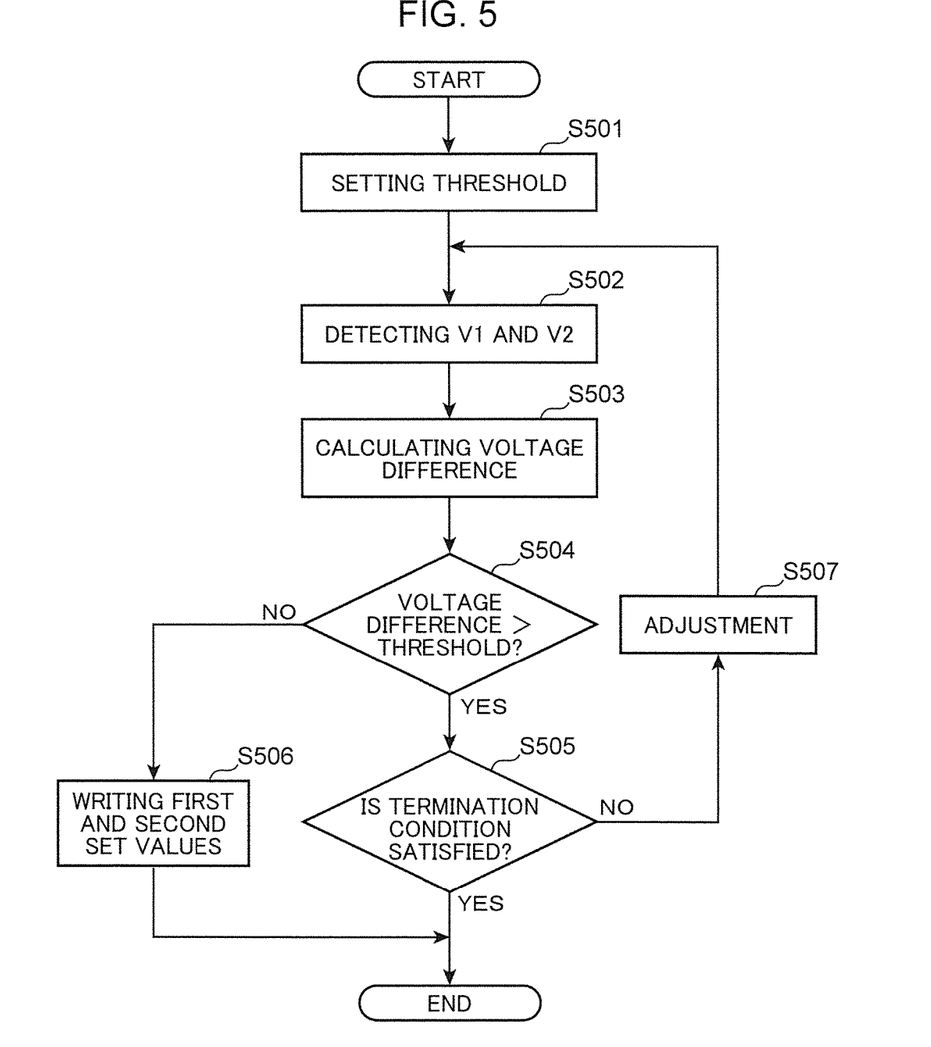
FIG. 5 is a flowchart depicting a processing routine of the voltage adjustment system according to this embodiment.

FIG. 5 is a flowchart depicting a processing routine of the voltage adjustment system 1 according to this embodiment. Assume that, at a timing of starting this flowchart, the first power supply circuit 11 (second power supply circuit 12) generates a first DC voltage V1 (second DC voltage V2) according to a default first setting value Si (default second setting value S2), and supply the generated first DC voltage V1 (generated second DC voltage V2) to the sub CPU 131 (main CPU 132). The default first and second setting values S1, S2 are set to the same value.

First of all, in step S501, the voltage adjustment section 22 sets a threshold for evaluating a voltage difference between the first and second DC voltages V1, V2.

Then, the detection section 21 detects each of the first and second DC voltages V1, V2 (step S502).

Then, the voltage adjustment section 22 calculates an absolute value of a voltage difference between the first and second DC voltages V1, V2 detected in the step S502 (step S503).

Then, the voltage adjustment section 22 determines whether or not the absolute value of the voltage difference calculated in the step S503 is greater than the threshold set in the step S501 (step S504). When the voltage difference is greater than the threshold (YES in the step S504), the voltage adjustment section 22 advances the processing routine to step S505.

Then, when a termination condition is not satisfied in the step S505 (NO in the step S505), the first and second DC voltages V1, V2 are adjusted (step S507), and the processing routine is returned to the step S502. On the other hand, when the termination condition is satisfied (YES in the step S505), the processing routine is terminated. For example, the termination condition may be a situation where the number of times of the adjustment of the first and second DC voltages V1, V2 reaches a given upper limit. The termination condition may also be a situation where each of the first and second DC voltages V1, V2 is less than 1.06 V in the diagram depicted in FIG. 6. Further, the termination condition may be a situation where each of the first and second DC voltages V1, V2 is greater than 1.14 V in the diagram depicted in FIG. 6. In these situations, the voltage adjustment section 22 determines that it has failed to adjust the voltage difference to become equal to or less than the threshold, and the processing routine is terminated.

On the other hand, when the voltage difference is equal to or less than the threshold (NO in the step S504), the voltage adjustment section 22 determines that the adjustment has been successfully completed, and writes currently-set first and second setting values S1, S2 in the memory 14 (step S506). Subsequently, when power is applied to the image forming apparatus 5 to activate the circuit board 10, the first power supply circuit 11 (second power supply circuit 12) generates a first DC voltage V1 (second DC voltage V2), using the first setting value S1 (second setting value S2) written in the memory 14. Thus, the voltage difference between the first and second DC voltages V1, V2 becomes equal to or less than the threshold, so that the first and second DC voltages V1, V2 can satisfy the requirement imposed on the SOC 13.

(Details of Adjustment)

The adjustment in the step S507 will be described in detail below. In this example, assume that, according to the requirement imposed on the SOC 13, the first and second DC voltages V1, V2 to be supplied, respectively, to the sub CPU 131 and the main CPU 132, are set as follows.

V1: 1.1 V±0.1 V
V2: 1.1 V±0.1 V
Voltage difference between V1 and V2: within 50 mV That is, according to the requirement imposed on the SOC 13, a desired supply voltage to each of the sub CPU 131 and the main CPU 132, i.e., a supply voltage desired for each of the sub CPU 131 and the main CPU 132, is 1.1 V. The voltage difference between the first DC voltage V1 and the second DC voltage V2 is set within 50 mV. However, in the following description, a criterion (threshold) of the voltage difference is set on the safe side, specifically, to 40 mV.

Figure 7:
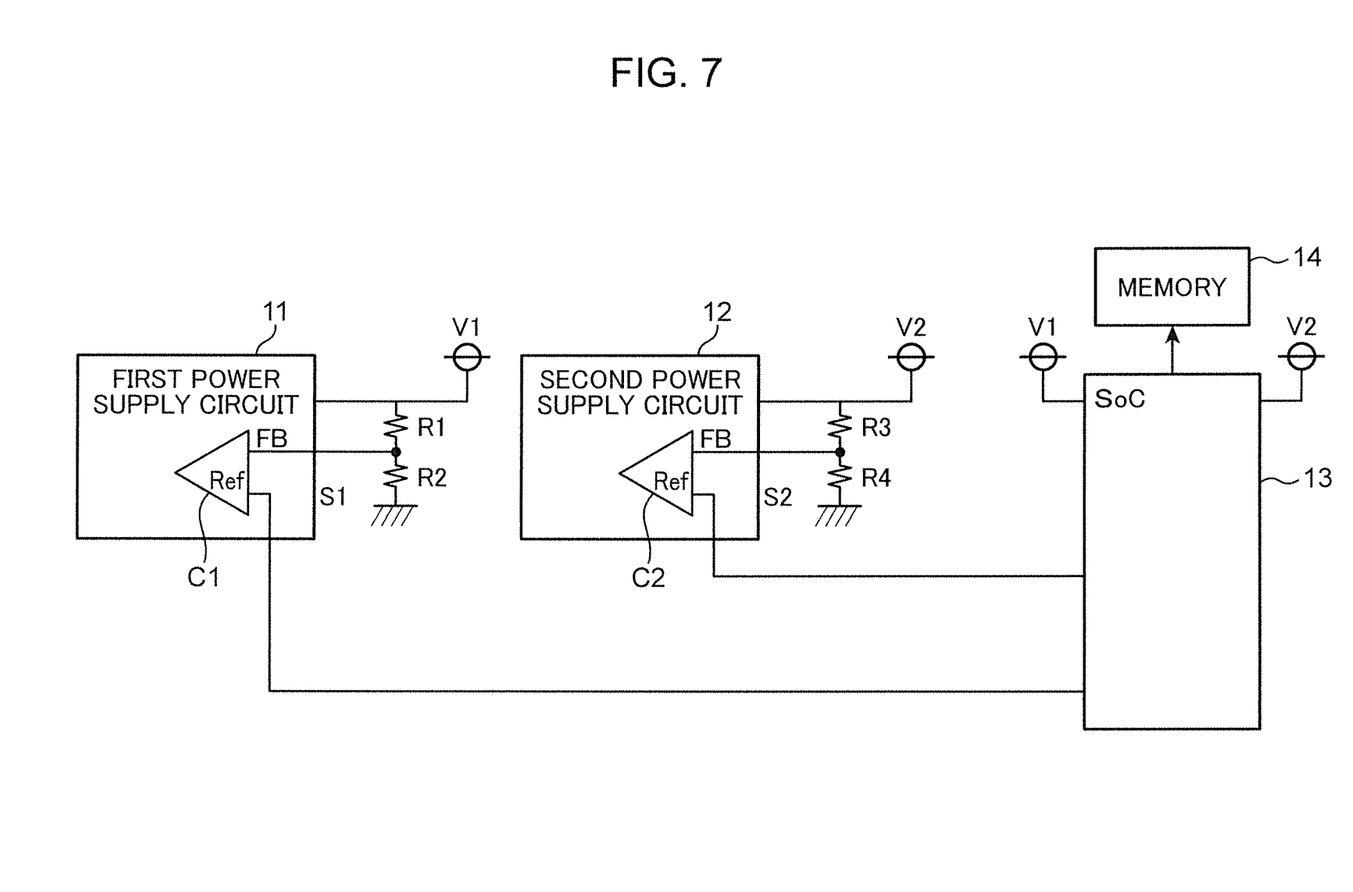
FIG. 7 is a diagram depicting a detailed circuit configuration of first and second power supply circuits and a SOC.

Each of the first and second power supply circuits 11, 12 is capable of adjusting a reference voltage Vref via the I/F 133, wherein the reference voltage can be adjusted by increments of 0.01 V.

Figure 6:
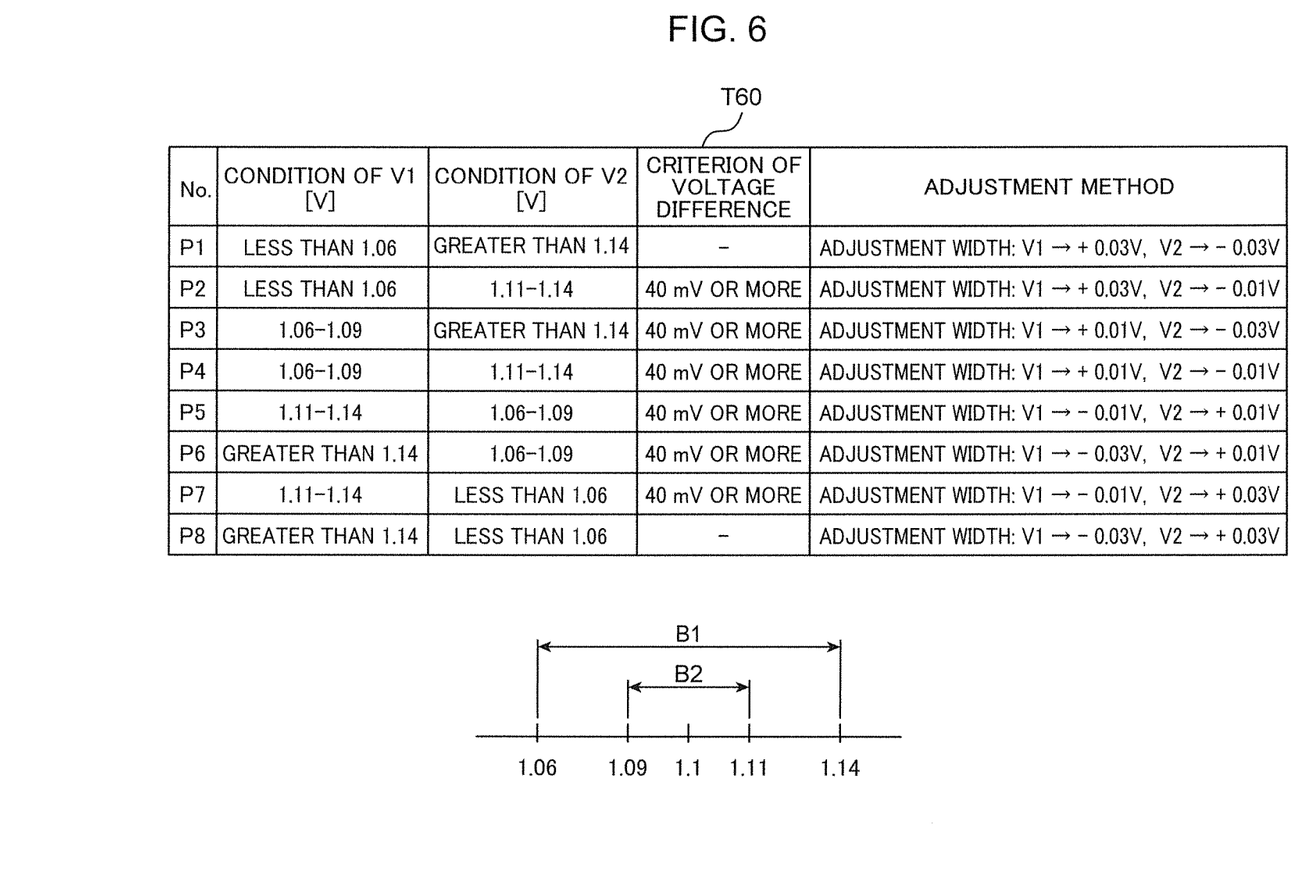
FIG. 6 is a diagram depicting one example of a table to be referred to when a voltage adjustment section performs adjustment.

The voltage adjustment section 22 is preliminarily provided with a table T60 depicted in FIG. 6, and operable to adjust the first and second DC voltages V1, V2 using the table T60.

FIG. 6 is a diagram depicting a table T60 as one example of a table to be referred to when the voltage adjustment section 22 performs the adjustment. The table T60 specifies eight adjustment patterns P1 to P8. In each of the adjustment patterns, a condition of the first DC voltage V1, a condition of the second DC voltage V2, a criterion of the voltage difference and a measurement method are set.

The table T60 is defined based on an allowable voltage range to be satisfied by each of the first and second DC voltages V1, V2. Referring to the table T60, 1.06 V is a lower limit of the allowable voltage range, and 1.14 V is an upper limit of the allowable voltage range. Further, the lower portion of FIG. 6 depicts a relationship between the allowable voltage range B1 and an allowable voltage sub-range B2.

The allowable voltage range B1 is set within a range of ±40 mV, wherein a center value of the range is the desired supply voltage (=1.1 V).

The table T60 is also defined based on the allowable voltage sub-range B2. A lower limit and an upper limit of the allowable voltage sub-range B2 are, respectively, 1.09 V and 1.11 V. That is, the allowable voltage sub-range B2 is set within a range of ±10 mV, wherein a center value of the range is the desired supply voltage (=1.1 V).

The adjustment method is established by combinations of: the case where an adjustment width of the first DC voltage V1 is set to + or −0.03 V; the case where the adjustment width of the first DC voltage V1 is set to + or −0.01 V; the case where an adjustment width of the second DC voltage V2 is set to + or −0.03 V; and the case where the adjustment width of the second DC voltage V1 is set to + or −0.01 V.

Specifically, in each of the adjustment patterns P1, P8, both of the first and second DC voltages V1, V2 are out of the allowable voltage range B1, and thereby the adjustment width of each of the first and second DC voltages V1, V2 is set to + or −0.03 V.

In each of the adjustment patterns P2, P7, a smaller one of the first and second DC voltages V1, V2 is less than the lower limit of the allowable voltage range B1, and the remaining, larger, one of the first and second DC voltages V1, V2 is in a range from the upper limit of the allowable voltage sub-range B2 to the upper limit of the allowable voltage range B1. Therefore, the adjustment width of the smaller DC voltage is set to +0.03 V, and the adjustment width of the larger DC voltage is set to −0.01 V.

In each of the adjustment patterns P3, P6, a smaller one of the first and second DC voltages V1, V2 is in a range from the lower limit of the allowable voltage range B1 to the lower limit of the allowable voltage sub-range B2, and the remaining, larger, one of the first and second DC voltages V1, V2 is greater than the upper limit of the allowable voltage range B1. Therefore, the adjustment width of the smaller DC voltage is set to +0.01 V, and the adjustment width of the larger DC voltage is set to −0.03 V.

In each of the adjustment patterns P4, P5, a smaller one of the first and second DC voltages V1, V2 is in a range from the lower limit of the allowable voltage range B1 to the lower limit of the allowable voltage sub-range B2, and the remaining, larger, one of the first and second DC voltages V1, V2 is in a range from the upper limit of the allowable voltage sub-range B2 to the lower limit of the allowable voltage range B1. Therefore, the adjustment width of the smaller DC voltage is set to +0.01 V, and the adjustment width of the larger DC voltage is set to −0.01 V.

Each of the adjustment patterns P1 to P8 is configured such that the adjustment width of the first DC voltage V1 is increased along with an increase in difference between the desired supply voltage (=1.1 V) and the first DC voltage V1, and the adjustment width of the second DC voltage V2 is increased along with an increase in difference between the desired supply voltage and the second DC voltage V2.

Referring to the table T60, in each of the adjustment patterns P2 to P7, 40 mV is assigned as the criterion of the voltage difference. Differently, in each of the adjustment patterns P1, P8, the criterion of the voltage difference is not specifically assigned. This is because, under the conditions defining each of the adjustment patterns P1, P8, the voltage difference between the first and second DC voltages V1, V2 essentially becomes equal to or greater than 40 mV. Further, the reason for setting the criterion of the voltage difference in each of the adjustment patterns P2 to P7 is that, even under the conditions defining each of the adjustment patterns P2 to P7, the requirement imposed on the SOC 13 is satisfied when the voltage difference between the first and second DC voltages V1, V2 is 40 mV or less.

Further, in the table T60, the case where both of the first and second DC voltages V1, V2 are within the allowable voltage sub-range B2 is not specified, because, in this case, the voltage difference between the first and second DC voltages V1, V2 essentially becomes equal to or less than 40 mV.

For example, assume that a detected value of the first DC voltage V1 is 1.142 V, and a detected value of the second DC voltage V2 is 1.083 V.

In this case, a voltage difference |V1−V2|=0.059 V. Thus, the voltage adjustment section 22 determines that there is a need for adjustment, and refers to the adjustment pattern P6 from the table T60 to set the adjustment width of the first DC voltage V1 and the adjustment width of the second DC voltage V2, respectively, to −0.03V and +0.01 V.

Then, the voltage adjustment section 22 creates a first setting value S1 for reducing a current value of the first DC voltage V1 by 0.03V and a second setting value S2 for increasing a current value of the second DC voltage V2 by 0.01V, and transfers the created setting values to the SOC 13. The SOC 13 transmits the received first and second setting values S1, S2, respectively, to the first and second power supply circuits 11, 12. Then, the first power supply circuit 11 outputs the first DC voltage V1 reduced by 0.03 V, to the sub CPU 131, and the second power supply circuit 12 outputs the second DC voltage V2 increased by 0.01 V, to the main CPU 132.

The voltage adjustment section 22 will repeat such adjustment until the voltage difference between the first and second DC voltages V1, V2 becomes equal to or less than the threshold (=40 mV). Then, when the voltage difference between the first and second DC voltages V1, V2 becomes equal to or less than the threshold, the voltage adjustment section 22 writes the first and second setting values S1, S2 at that time, in the memory 14.

In the case where, even after repeating the adjustment given times, the voltage difference between the first and second DC voltages V1, V2 does not become equal to or less than the threshold, the voltage adjustment section 22 may determine that the first and second power supply circuits 11, 12 are defective, and terminate the processing routine. In this case, the voltage adjustment section 22 may operate to display, on a display (not depicted), information indicating that the first and second power supply circuits 11, 12 are defective.

FIG. 7 is a diagram depicting a detailed circuit configuration of the first and second power supply circuits 11, 12 and the SOC 13. The first power supply circuit 11 comprises a comparator C1. The first DC voltage V1 divided by two voltage-dividing resistors R1, R2 is input into one FB of two input terminals of the comparator C1. In this way, the first DC voltage V1 is fed back. The first setting value S1 is input from the SOC 13 into the other input terminal Ref of the comparator C1.

The second power supply circuit 12 also comprises a comparator C2. The second DC voltage V2 divided by two voltage-dividing resistors R3, R4 is input into one FB of two input terminals of the comparator C2. The second setting value S2 is input from the SOC 13 into the other input terminal Ref of the comparator C2. The SOC 13 is supplied with the first and second DC voltages V1, V2.

In this configuration, the first setting value S1 sets a reference voltage Vref1 of the input terminal Ref of the comparator C1, and the first setting value S2 sets a reference voltage Vref2 of the input terminal Ref of the comparator C2.

Figure 8:
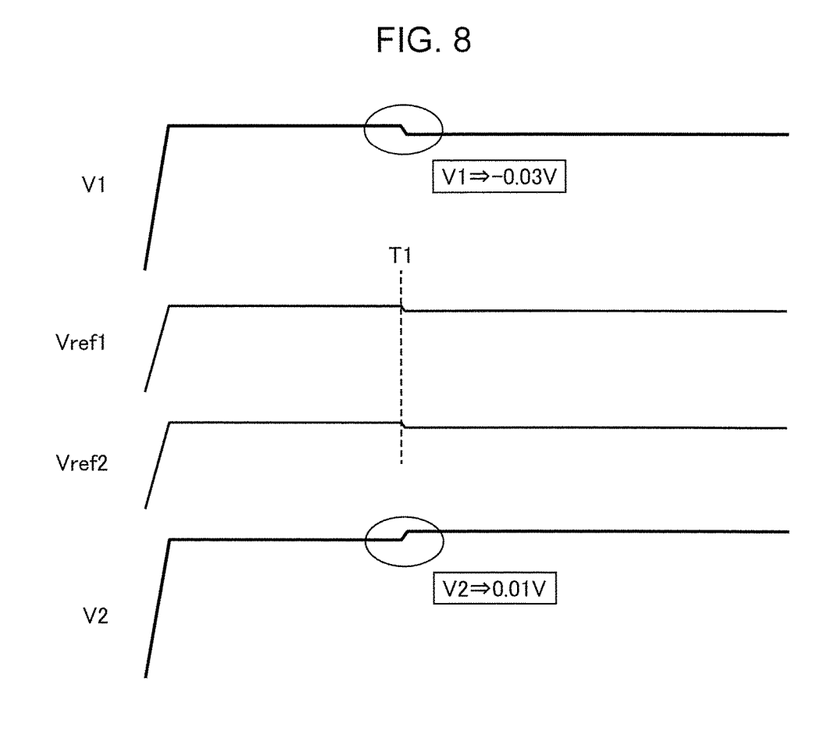
FIG. 8 is waveform charts of first and second DC voltages and reference voltages.

FIG. 8 is waveform charts of the first and second DC voltages V1, V2 and the reference voltages Vref1, Vref2. As depicted in the second uppermost chart, at timing T1, the reference voltage Vref1 is lowered by a value corresponding to 0.03 V. In response to this, as depicted in the uppermost chart, at the timing T1, the first DC voltage V1 is lowered by 0.03 V.

Further, as depicted in the second lowermost chart, at the timing T1, the reference voltage Vref2 is lowered by a value corresponding to 0.01 V. In response to this, as depicted in the lowermost chart, at the timing T1, the second DC voltage V2 is lowered by 0.01 V.

As depicted in FIG. 3, the output voltage Vout of the power supply circuit is defined by the following formula: Vout=((R10+R20)/R20)×Vref. Thus, Vout rises along with a rise of Vref, and Vout decreases along with a decrease in Vref. Therefore, the voltage adjustment section 22 can increase and reduce the first DC voltage V1 (second DC voltage V2) by increasing and reducing the reference voltage Vref1 (reference voltage Vref2), i.e., the first setting value S1 (second setting value S2).

Outline of Embodiment (1) The voltage adjustment system 1 is operable to adjust each of the first and second set values S1, S2 to cause a corresponding one of the first and second DC voltages V1, V2 detected by the detection section 21 to fall within the allowable voltage range B1 in which the desired supply voltage to each of the sub CPU 131 and the main CPU 132 is set as a center value. Thus, even if a low-cost power supply circuit having a large variation in performance is employed as the first and second power supply circuits 11, 12, it becomes possible to reduce the voltage difference between the first and second DC voltages V1, V2 to be supplied, respectively, to the sub CPU 131 and the main CPU 132. This makes it possible to reduce the voltage difference between the first and second DC voltages V1, V2 to be supplied, respectively, to the sub CPU 131 and the main CPU 132, without an increase in cost of the circuit board 10. Further, the adjusted first and second setting values S1, S2 are written in the memory 14, so that it becomes possible to supply the first and second DC voltages V1, V2 having a reduced voltage difference to the sub CPU 131 and the main CPU 132, at the time of re-activation of the circuit board 10. This makes it possible to prevent false operation of the circuit board 10.

(2) The voltage adjustment system 1 is operable to calculate the absolute value of the voltage difference between the first and second DC voltages V1, V2, and repeat the adjustment of each of the first and second setting values S1, S2 until the calculated absolute value of the voltage difference becomes equal to or less than the threshold. This makes it possible to reduce the voltage difference between the first and second DC voltages V1, V2 and allow each of the first and second DC voltages V1, V2 to come close to the desired supply voltage to each of the sub CPU 131 and the main CPU 132.

(3) The voltage adjustment system 1 is operable to adjust the first and second DC voltages V1, V2 by increasing the adjustment width of the first setting value S1 as a difference between the desired supply voltage and the first DC voltage V1 has a larger value, and increasing the adjustment width of the second setting value S2 as a difference between the desired supply voltage and the second DC voltage V2 has a larger value. This makes it possible to achieve shortening of adjustment time.

Modified Embodiment

Figure 9:
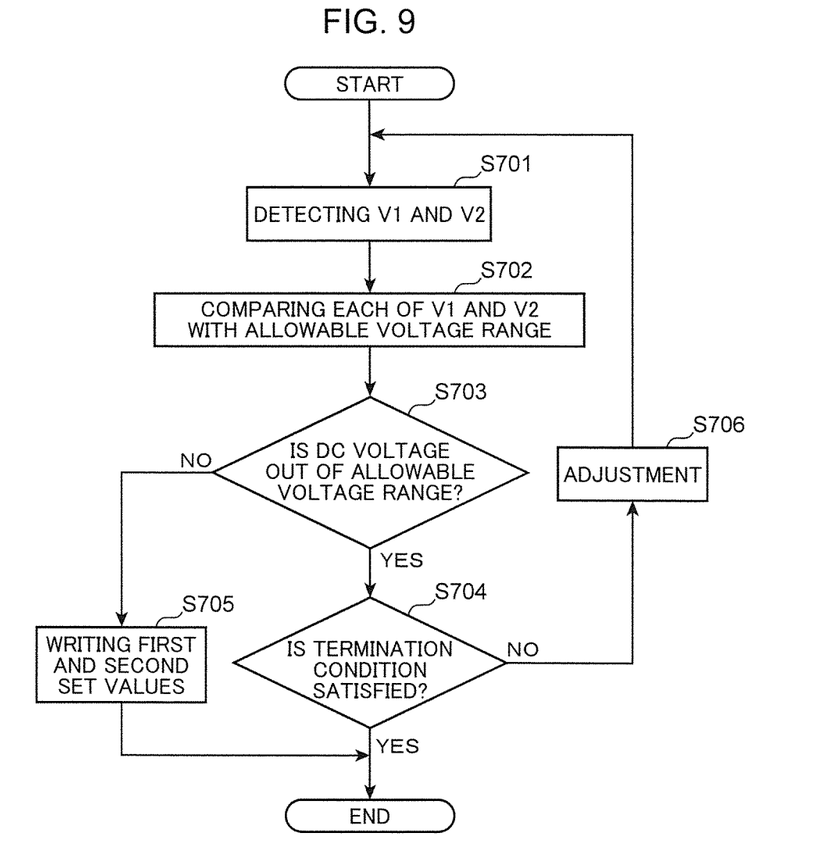
FIG. 9 is a flowchart depicting a processing routine of a modification of the voltage adjustment system according to this embodiment.

A modification of the voltage adjustment system 1 according to the above embodiment will be described below. FIG. 9 is a flowchart depicting a processing routine of a voltage adjustment system 1 according to the modified embodiment. The voltage adjustment system 1 according to the modified embodiment is characterized in that the adjustment is performed without taking into account the voltage difference between the first and second DC voltages V1, V2.

First of all, in step S701, the detection section 21 detects each of the first and second DC voltages V1, V2. Then, the voltage adjustment section 22 compares each of the detected first and second DC voltages V1, V2 with the allowable voltage range B1 (step S702).

Then, when it is determined that one of the first and second DC voltages V1, V2 is out of the allowable voltage range (YES in step S703), the voltage adjustment section 22 advances the processing routine to step S704. Then, when a termination condition is not satisfied (NO in the step S704), the voltage adjustment section 22 adjusts the DC voltage determined to be out of the allowable voltage range (step S706), and returns the processing routine to the step S701.

On the other hand, in the step S703, when it is determined that none of the first and second DC voltages V1, V2 is out of the allowable voltage range (NO in the step S703), the voltage adjustment section 22 determines that the adjustment of the first and second DC voltages V1, V2 has been successfully completed, and writes currently-set first and second setting values S1, S2 in the memory 14 (step S705) to terminate the processing routine.

The termination condition in the step S704 may be a situation where both of the first and second DC voltages V1, V2 are out of the allowable voltage range B1, or may be a situation where the number of times of the adjustment of the first and second DC voltages V1, V2 reaches a given upper limit.

Figure 10:
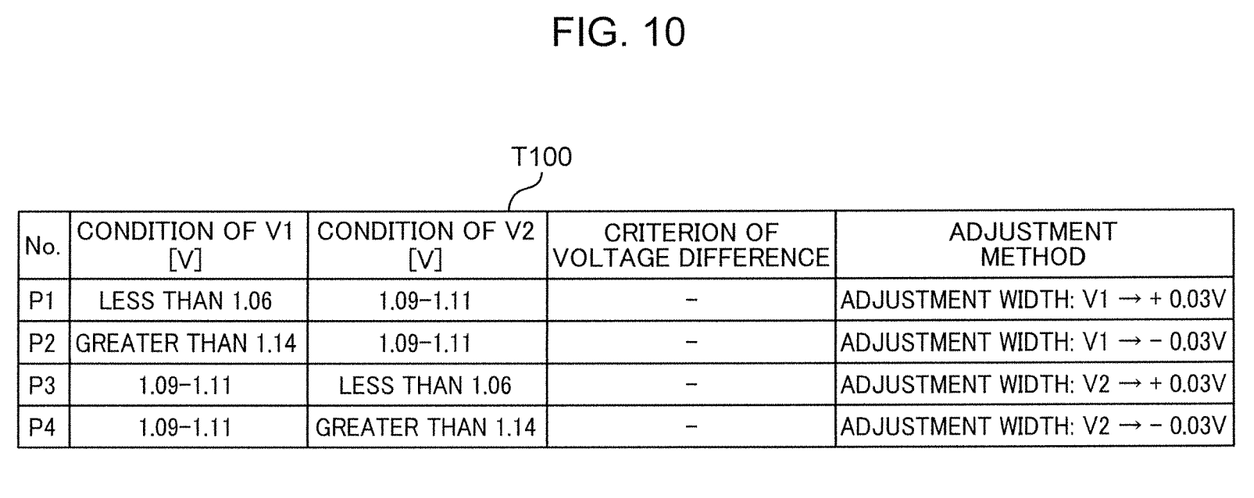
FIG. 10 is a diagram depicting one example of a table to be referred to when a voltage adjustment section performs adjustment in the modification.

The adjustment in the step S706 will be described in detail below. FIG. 10 is a diagram depicting a table T100 as one example of a table to be referred to when the voltage adjustment section 22 performs adjustment in the modified embodiment. The table T100 specifies four adjustment patterns P1 to P4. In each of the adjustment patterns, a condition of the first DC voltage V1, a condition of the second DC voltage V2, a criterion of the voltage difference and a measurement method are set. In this modified embodiment, the voltage difference is not taken into consideration. Thus, the field of "criterion of voltage difference" is entirely left blank.

The table T100 is defined based on the allowable voltage range B1 (lower limit: 1.06 V, upper limit: 1.14 V) and the allowable voltage sub-range B2 (lower limit: 1.09 V, upper limit: 1.11 V), as with the table T60.

In the example depicted in the table T100, one of the first and second DC voltages V1, V2 being out of the allowable voltage range B1 is subjected to the adjustment. Thus, in the table T100, the adjustment method is defined by the adjustment patterns P1, P2 in which the adjustment width of the first DC voltage V1 is set to + or −0.03 V, and the adjustment patterns P3, P4 in which the adjustment width of the second DC voltage V2 is set to + or −0.03 V.

Specifically, in each of the adjustment patterns P1, P3, a smaller one of the first and second DC voltages V1, V2 is less than the lower limit of the allowable voltage range B1, and the remaining, larger, one of the first and second DC voltages V1, V2 is within the allowable voltage sub-range B2. Thus, only the smaller DC voltage is subjected to the adjustment, wherein the adjustment width of the smaller DC voltage is set to +0.03 V.

In each of the adjustment patterns P2, P4, a smaller one of the first and second DC voltages V1, V2 is within the allowable voltage sub-range B2, and the remaining, larger, one of the first and second DC voltages V1, V2 is greater than the upper limit of the allowable voltage range B1. Thus, only the larger DC voltage is subjected to the adjustment, wherein the adjustment width of the larger DC voltage is set to −0.03 V.

In the table T100, there is no adjustment pattern assuming a situation where one of the first and second DC voltages V1, V2 is out of the allowable voltage range B1 and the remaining one of the first and second DC voltages V1, V2 is within the allowable voltage range B1 and out of the allowable voltage sub-range B2. In this situation, the voltage adjustment section 22 may operate to display, on a display (not depicted), information indicating that the circuit board 10 is defective.

(Outline of Modified Embodiment)

In the voltage adjustment system 1 according to the modified embodiment, when at least one of the first and second DC voltages V1, V2 detected by the detection section 21 is out of the allowable voltage range B1, only the at least one DC voltage is subjected to the adjustment, so that it becomes possible to simplify the adjustment. In the table T100, only one DC voltage being out of the allowable voltage range B1 is subjected to the adjustment. However, it should be noted that, in the case where both of the first and second DC voltages V1, V2 are out of the allowable voltage range B1, the two DC voltages may be subjected to the adjustment.

(Image Forming Apparatus)

Figure 11:
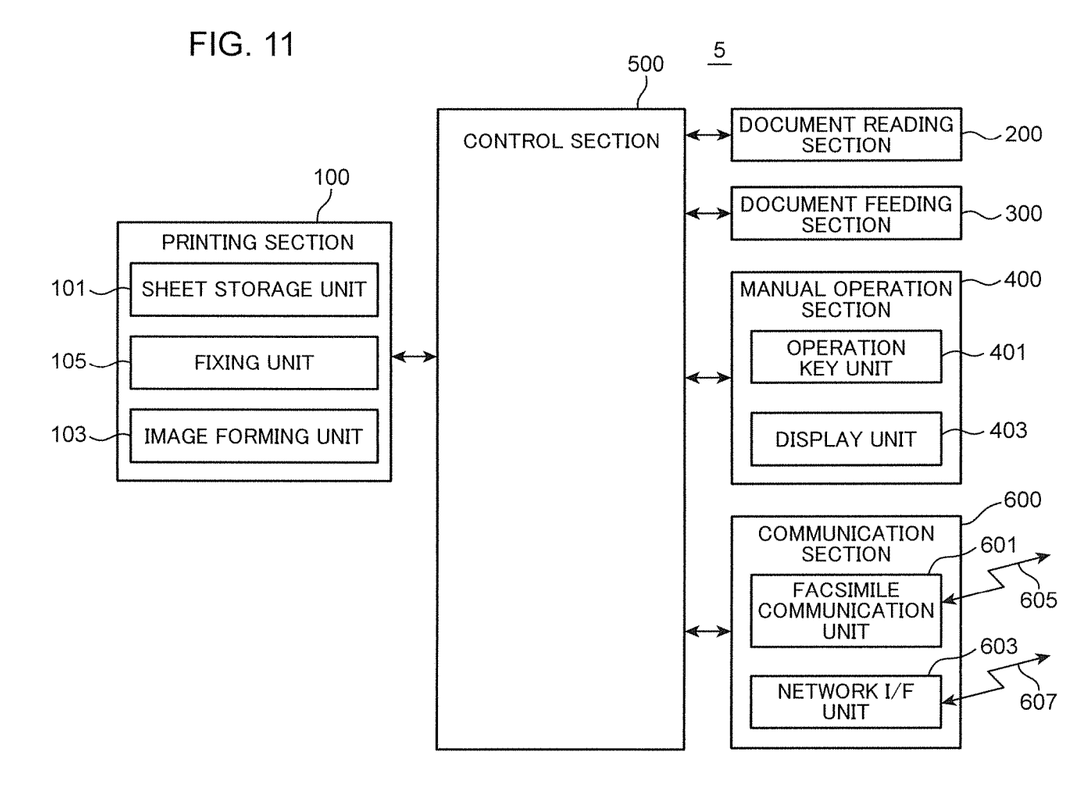
FIG. 11 is a block diagram depicting a configuration of an image forming apparatus equipped with a circuit board.

The circuit board 10 in the above embodiment can be mounted on an image forming apparatus. FIG. 11 is a block diagram depicting a configuration of an image forming apparatus 5 equipped with the circuit board 10. The circuit board 10 is used as a circuit board of an aftermentioned control section 500.

The following description will be made by taking a digital complex machine having functions of a copier, a printer, a scanner and a facsimile, as an example of the image forming apparatus 5. It should be understood that the image forming apparatus 5 is not limited to a digital complex, as long as it has a function of printing an image. For example, the image forming apparatus 5 may be a printer. The image forming apparatus 5 comprises a printing section 100, a document reading section 200, a document feeding section 300, a manual operation section 400, a control section 500, and a communication section 600.

The document feeding section 300 is operable, when one document is placed on a document loading unit provided in the document feeding section 300, to feed the document to the document reading section 200. On the other hand, the document feeding section 300 is operable, when a plurality of documents are placed on the document loading unit, to sequentially feed the documents to the document reading section 200.

The document reading section 200 is operable to read a document placed on a platen or a document fed from the document feeding section 300, and output image data of the document.

The printing section 100 comprises a sheet storage unit 101, an image forming unit 103, and a fixing unit 105. The sheet storage unit 101 is capable of storing a stack of sheets. According to driving of a pick-up roller (not depicted), an uppermost one of the stack of stored sheets is fed toward a sheet conveyance path (not depicted). The sheet is conveyed to the image forming unit 103 through the sheet conveyance path.

The image forming unit 103 comprises a photosensitive drum, an exposure sub-unit, a developing device and a transfer sub-unit, wherein it is operable to form a toner image on a sheet conveyed thereto, by an electrophotographic process.

The manual operation section 400 comprises an operation key unit 401 and a display unit 403. The display unit 403 has a touch panel function, and can display thereon a screen image including soft keys. A user can manually operate the soft keys while viewing the screen image, to perform setting and others necessary for executing a function such as copying.

The operation key unit 401 is provided with operation keys composed of hard keys. Examples of the operation keys include a start key, a numerical keypad, a reset key, and a function switching key for switching between respective ones of a copier, a printer and a facsimile.

The control section 500 is composed of the circuit board 10 and operable to govern the entire control of the image forming apparatus 5.

The communication section 600 comprises a facsimile communication unit 601 and a network I/F unit 603. The facsimile communication unit 601 comprises a network control unit (NCU) for controlling a connection of a phone line with the other-end facsimile, and a modem circuit for modulating and demodulating a signal for facsimile communication. The facsimile communication unit 601 is connected to a phone line 605.

The network I/F unit 603 is connected to a local area network (LAN) 607. The network I/F unit 603 is a communication interface circuit for performing communication with a personal computer connected to the LAN 607.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A voltage adjustment system comprising: a circuit board; and an adjustment device for adjusting a supply voltage to the circuit board,
wherein
the circuit board includes:
an integrated circuit comprising a first core configured such that energization thereof is not interrupted during a power-saving mode, and a second core configured such that energization thereof is interrupted during the power-saving mode;
a first power supply circuit configured to produce a first DC voltage to be supplied to the first core, using a first setting value;
a second power supply circuit configured to produce a second DC voltage to be supplied to the second core, using a second setting value; and
a memory configured to store therein the first and second setting values, and
the adjustment device includes:
a detection section configured to detect the first and second DC voltages output, respectively, from the first and second power supply circuits; and
a voltage adjustment section configured to adjust each of the first and second setting values to cause a corresponding one of the detected first and second DC voltages to fall within an allowable voltage range in which a desired supply voltage to each of the first and second cores is set as a center value, and, write the adjusted first and second setting values in the memory as the first and second setting values at the time of re-activation of the circuit board.

2. The voltage adjustment system as recited in claim 1, wherein the voltage adjustment section is configured to calculate a voltage difference between the detected first and second DC voltages, and repeat the adjustment of each of the first and second setting values until the calculated voltage difference becomes equal to or less than a threshold.

3. The voltage adjustment system as recited in claim 2, wherein the voltage adjustment section is configured to, during the adjustment, increase an adjustment width of the first setting value as a difference between the desired supply voltage and the detected first DC voltage has a larger value, and increase an adjustment width of the second setting value as a difference between the desired supply voltage and the detected second DC voltage has a larger value.

4. The voltage adjustment system as recited in claim 1, wherein the voltage adjustment section is configured to, when at least one of the detected first and second DC voltages is determine to be out of the allowable voltage range, adjust at least one of the first and second setting values corresponding to the determined DC voltage to cause the determined DC voltage to fall within the allowable voltage range.

5. A method of adjusting a supply voltage to a circuit board,
wherein the circuit board includes:
an integrated circuit comprising a first core configured such that energization thereof is not interrupted during a power-saving mode, and a second core configured such that energization thereof is interrupted during the power-saving mode;
a first power supply circuit configured to produce a first DC voltage to be supplied to the first core, using a first setting value;
a second power supply circuit configured to produce a second DC voltage to be supplied to the second core, using a second setting value; and
a memory configured to store therein the first and second setting values,
the method comprising:
detecting the first and second DC voltages output, respectively, from the first and second power supply circuits;
adjusting each of the first and second setting values to cause a voltage difference between the detected first and second DC voltages to become equal to or less than a threshold; and
writing the adjusted first and second setting values in the memory as the first and second setting values at the time of re-activation of the circuit board.

* * * * *